(12) United States Patent
Power

(10) Patent No.: US 10,935,041 B2
(45) Date of Patent: Mar. 2, 2021

(54) PRESSURE RECOVERY AXIAL-COMPRESSOR BLADING

(71) Applicant: Rolls-Royce Corporation, Indianapolis, IN (US)

(72) Inventor: Bronwyn Power, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 1319 days.

(21) Appl. No.: 15/197,137

(22) Filed: Jun. 29, 2016

(65) Prior Publication Data

US 2018/0003189 A1   Jan. 4, 2018

(51) Int. Cl.
| | |
|---|---|
| F04D 29/32 | (2006.01) |
| F01D 5/14 | (2006.01) |
| F04D 29/38 | (2006.01) |
| F04D 29/54 | (2006.01) |

(52) U.S. Cl.
CPC ........... *F04D 29/324* (2013.01); *F01D 5/141* (2013.01); *F01D 5/145* (2013.01); *F04D 29/384* (2013.01); *F04D 29/544* (2013.01); *F05D 2240/123* (2013.01); *F05D 2240/124* (2013.01); *F05D 2240/305* (2013.01); *F05D 2240/306* (2013.01); *F05D 2250/713* (2013.01)

(58) Field of Classification Search
CPC .......... F01D 5/141; F01D 5/142; F01D 5/145; F04D 29/324; F04D 29/542; F04D 29/544; F04D 29/384; F05D 2240/123; F05D 2240/124; F05D 2240/305; F05D 2240/306; F05D 2250/713; F05B 2250/713
USPC ....................................................... 415/914
See application file for complete search history.

(56) References Cited

U.S. PATENT DOCUMENTS

| | | | | |
|---|---|---|---|---|
| 2,801,790 | A * | 8/1957 | Doll, Jr. ................ | F04D 29/681 415/192 |
| 4,080,102 | A * | 3/1978 | Schwab ................. | F01D 5/141 416/223 A |
| 5,480,284 | A | 1/1996 | Wadia et al. | |
| 5,904,470 | A | 5/1999 | Kerrebrock et al. | |
| 6,379,110 | B1 | 4/2002 | McCormick et al. | |
| 8,573,946 | B2 | 11/2013 | Power et al. | |
| 2002/0021968 | A1* | 2/2002 | Olhofer .................. | F04D 21/00 416/223 R |

(Continued)

FOREIGN PATENT DOCUMENTS

| | | |
|---|---|---|
| EP | 2019186 A1 | 1/2009 |
| EP | 2267274 A2 | 12/2010 |
| FR | 2282548 A1 | 3/1976 |

OTHER PUBLICATIONS

English machine translation of Fr 2,282,548, Mar. 19, 1976.*

(Continued)

*Primary Examiner* — Christopher Verdier
(74) *Attorney, Agent, or Firm* — Barnes & Thornburg LLP

(57) ABSTRACT

In accordance with some embodiments of the present disclosure, a pressure recovery axial compressor blade is provided. The blade may comprise a high pressure surface and a low pressure surface connected at a leading edge and a trailing edge of the blade. Both the high and low pressure surfaces extend span wise from a first end to a second end. At least one of the high and low pressure surfaces has a finite discontinuity in curvature at an intermediate position along the chord of the blade.

15 Claims, 4 Drawing Sheets

(56) References Cited

U.S. PATENT DOCUMENTS

| | | | | |
|---|---|---|---|---|
| 2003/0086788 A1* | 5/2003 | Chandraker | ............ | F01D 5/141 416/235 |
| 2005/0047919 A1* | 3/2005 | Nussbaum | ................ | F01D 5/10 416/235 |
| 2005/0207893 A1* | 9/2005 | Chandraker | ............ | F01D 5/141 416/223 R |
| 2008/0267772 A1* | 10/2008 | Harvey | .................. | F01D 5/141 415/191 |
| 2009/0116967 A1* | 5/2009 | Sleiman | ................. | F01D 5/141 416/241 R |
| 2010/0296924 A1 | 11/2010 | Boening Ralf et al. | | |
| 2010/0322777 A1* | 12/2010 | Power | .................... | F01D 5/145 416/231 B |

OTHER PUBLICATIONS

European Patent Office, Extended European Search Report for corresponding European Patent Application No. 17175176.1, dated Nov. 6, 2017, 7pgs.

European Patent Office, Communication pursuant to Article 94(3) EPC for corresponding European Patent Application No. 17175176.1, dated Jul. 9, 2019, 5 pgs.

\* cited by examiner

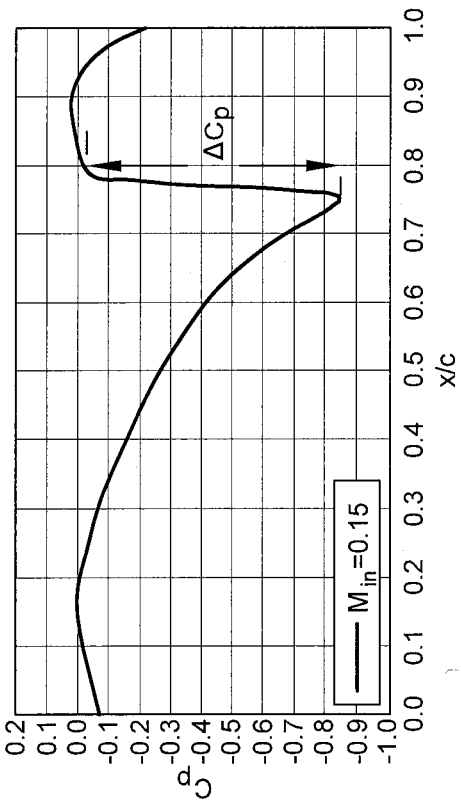
FIG. 3A
FIG. 3B
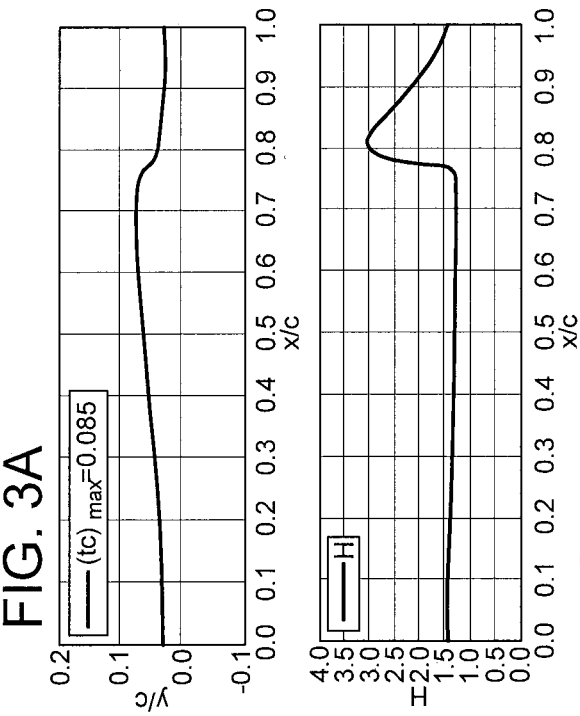
FIG. 3C

PRESSURE RECOVERY AXIAL-COMPRESSOR BLADING

BACKGROUND

Current compressor design relies on conventional airfoils, borrowed from aircraft wing theory, disposed in an annular duct. The design of both low- and high-subsonic airfoils in modern, axial-flow compressors has remained essentially the same since the mid-1980's when Hobbs and Weingold published their work on what is now known as the controlled-diffusion airfoil. Improvements in the performance of low- and high-subsonic axial-flow compressors having controlled-diffusion airfoils have been realized by optimizing the solidity, aspect-ratio, and three dimensional stacking of these airfoil sections leading to loss-reduction and increasing the operable incidence range. Further performance improvements have been realized by minimizing the blade-tip and stator shroud clearances, leakage paths, and bleed flows that can disrupt the flow in the blade rows. Finally, improvements to simulation tools have allowed designers to more accurately set the stage-matching of blade rows.

As the above approaches to improve airfoil performance have matured, it has become increasingly difficult to attain further improvements for modern, axial-flow compressors. State-of-the-art compressor technology has continued to show an asymptotic trend in performance.

Despite the design limitations of conventional compressors, the demand to increase compressor performance, and thereby reduce engine fuel consumption, remains high. There remains a need to minimize aerodynamic losses and increase the incidence-range of axial-flow compressor blading to reduce specific fuel consumption and improve the operating range of the attendant blading.

One way to improve the operating range of the attendant blading and reduce specific fuel consumption is to reduce the blade low-pressure suction-surface peak and high-pressure surface isentropic Mach numbers and the wetted surface areas of the blade. To reduce the blade surface isentropic Mach numbers, a new type of blade loading is required which in turn requires a new type of airfoil section. As disclosed herein, a new type of airfoil section is presented which minimizes blade surface Mach numbers, increases blade loading, and biases the mean chord-wise loading toward the rear of the airfoil. This airfoil may further reduce section loss, reduce blade count, and increase the operable negative-incidence range. The new airfoil can be applied to low- or high-subsonic, axial-flow compressor blading, including compressors with static and variable stators, and subsonic flow rotors.

In accordance with some embodiments of the present disclosure a blade is provided. The blade comprises a high pressure surface and a low pressure surface. Both the high and low pressure surfaces are connected at the leading edge and the trailing edge of the blade, and extend span wise from a first end to a second end. The low pressure surface has a discontinuity in the chord-wise curvature of an intermediate portion of the low pressure surface between the leading edge and the trailing edge of the blade. The high and low pressure surfaces of the blade form an uninterrupted surface between the first and second ends. The discontinuity may be aft of the mid chord at ⅔ chord, ¾ chord, or some other chord position. The discontinuity in curvature may be finite and sufficient to cause a reduction in the Mach number at the boundary layer edge.

In accordance with some embodiments of the present disclosure, a method of pressure recovery is presented. The method may be applied to a gas turbine which may have turbomachinary with a plurality of blades extending radially between a hub and a casing which operates on a gas stream. Each of the blades may have a high pressure surface and a low pressure surface, both of which are uninterrupted. The method comprises accelerating the gas stream to a subsonic velocity over the low pressure surface, maintaining the subsonic velocity of the gas stream across the low pressure surface on a front half chord of the blade approximately constant, introducing a discontinuity in curvature of the low pressure surface, and rapidly reducing the velocity of the gas stream proximate the discontinuity, thereby recovering pressure.

In accordance with some embodiments of the present disclosure, a turbine compressor blade is provided. The blade may comprise a solid interior bounded by a high pressure surface, a low pressure surface, a leading edge, a trailing edge, a first end, and a second end. The high and low pressure surfaces are connected to each other at the leading and trailing edges and both extend from the first end to the second end. At least one of the high pressure surface and low pressure surface has a discontinuity in curvature at an intermediate position along the chord of the blade.

These and many other advantages of the present subject matter will be readily apparent to one skilled in the art to which the invention pertains from a perusal of the claims, the appended drawings, and the following detailed description of preferred embodiments.

BRIEF DESCRIPTION OF THE DRAWINGS

FIG. 3A-3C illustrate the low pressure surface shape, boundary layer shape, and static pressure coefficient of an airfoil against the airfoil chord in accordance with some embodiments of the present disclosure.

Figure 1:
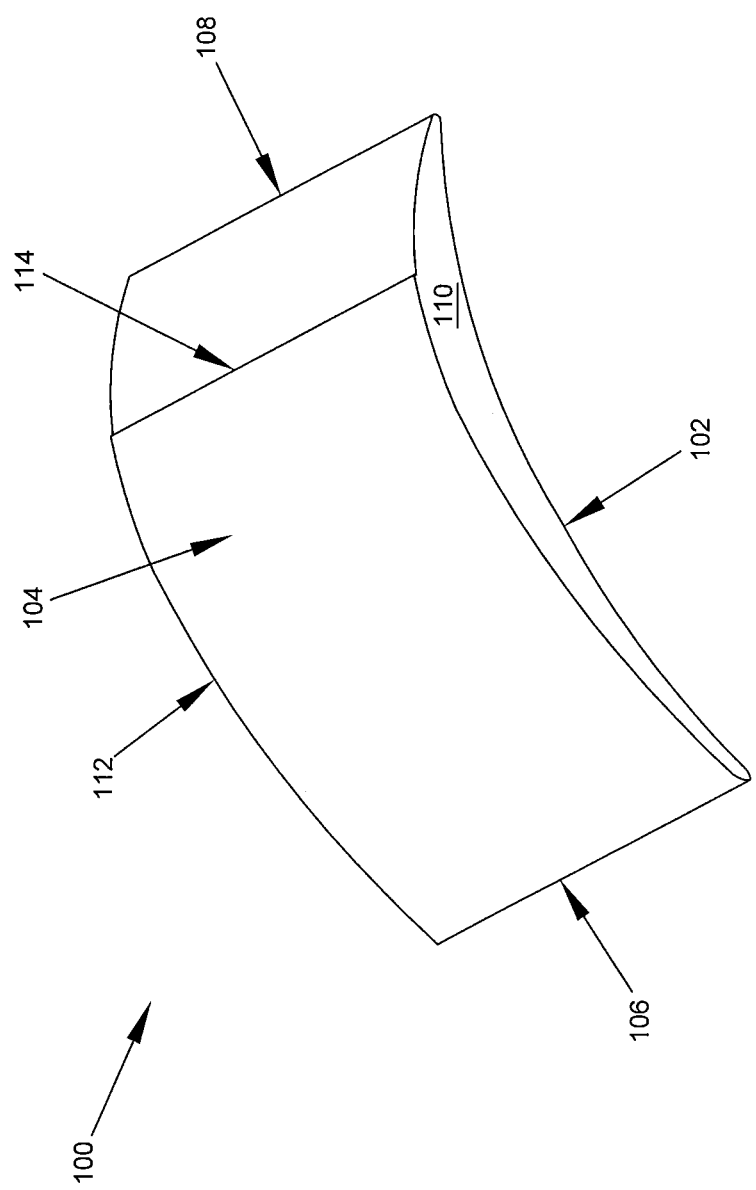
FIG. 1 is a prospective view of a blade in accordance with some embodiments of the present disclosure.

Referring to the drawings, some aspects of a non-limiting example of pressure recovery axial-compressor blading in accordance with an embodiment of the present disclosure is schematically depicted. In the drawings, various features, components and interrelationships therebetween of aspects of an embodiment of the present disclosure are depicted. However, the present disclosure is not limited to the particular embodiments presented and the components, features and interrelationships therebetween as are illustrated in the drawings and described herein.

DETAILED DESCRIPTION

The objectives and advantages of the claimed subject matter will become apparent from the following detailed description of preferred embodiments thereof in connection with the accompanying drawings.

In accordance with some embodiments of the present disclosure, a prospective view of a blade 100 is illustrated in FIG. 1. The blade 100 may comprise a high pressure surface 102, and a low pressure surface 104. The high and low pressure surfaces 102, 104 may be connected by a leading edge 106 and a trailing edge 108 and expand in a span wise direction between a first end 110 and a second end 112. The low pressure surface 104 may have a finite discontinuity 114 in the chord-wise curvature of an intermediate portion of the low pressure surface 104 between the leading edge 106 and the trailing edge 108. In some embodiments, the high and low pressure surfaces 102, 104 may form an uninterrupted surface between the first and second ends 110, 112. The blade 100 may be a compressor rotor or stator blade, and may comprise a solid interior between the high and low pressure surfaces 102,104. The blade 100 may be one of a plurality of blades in a gas turbine compressor.

As shown in FIG. 1, the blade 100 may have a thickness between the high and low pressure surfaces 102,104 which may increase monotonically from the leading edge 106 to a point of maximum thickness, although the blade thickness is not so limited in all embodiments. The discontinuity 114 may be located at, downstream of, or immediately downstream of the point of maximum blade thickness. The blade 100 may then decrease monotonically from the point of maximum thickness to the trailing edge 108.

In accordance with some embodiments, the first end 110 may comprise an end wall, which is substantially perpendicular to the span of the blade 100. In some embodiments, the second end 112 may comprise an end wall which is substantially perpendicular to the span of the blade 100.

In some embodiments, the discontinuity 114 may be located aft of the mid chord of the blade 100. The discontinuity 114 may be proximate to ⅔ or ¾ of the chord as measured from the leading edge 106 to the trailing edge 108. The discontinuity 114 in the curvature of the low pressure surface 104 may be caused by a discontinuity in one or more of the first and second derivatives of the low pressure surface 104 profile. In some embodiments, the blade 100 further comprises a discontinuity in the chord-wise curvature of the high pressure surface 102. The discontinuity 114 in the curvature of the low-pressure surface 104 may be sufficient to cause a reduction in the Mach number and thus increase the static pressure at the boundary layer edge (not shown).

Figure 2:
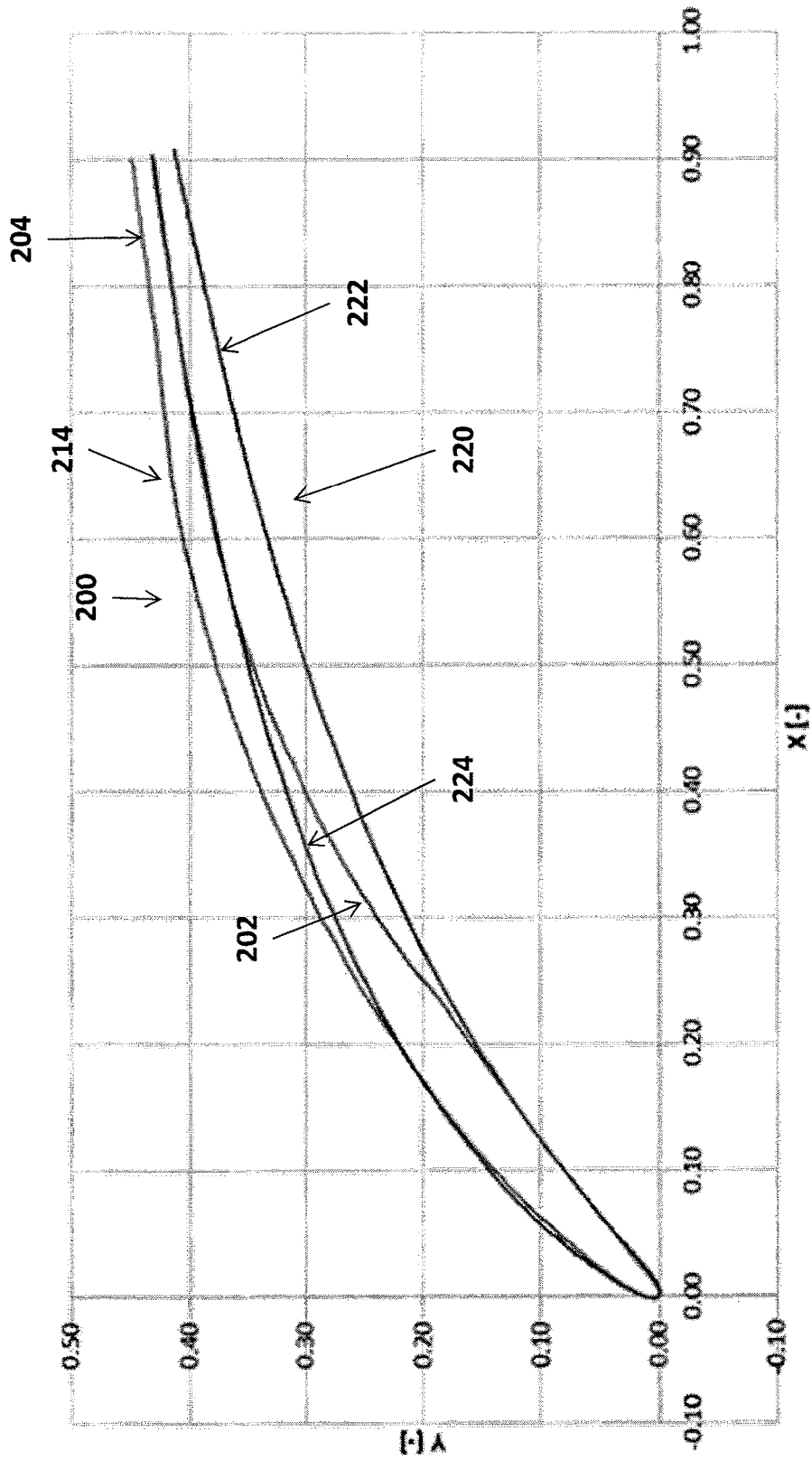
FIG. 2 is a profile view of a blade in accordance with some embodiments of the present disclosure.

A profile view of a blade 200 in accordance with some embodiments of the present disclosure is illustrated in FIG. 2. FIG. 2 further illustrates a conventional controlled diffusion blade 220. Both blades 200, 220 comprise a high-/low-pressure surface 202/204, 222/224 respectfully. Blade 200, however, further comprises a discontinuity 214 in its chord-wise curvature. This discontinuity 214 may be similar to the discontinuity 114 described above. This discontinuity 214 enables the primary static pressure recovery of the airfoil to be achieved over a very small fraction of the airfoil surface. In some embodiments a discontinuity may be applied to the high pressure surface 202, or both the high- and low-pressure surfaces 202,204. These arrangements allow for increased air foil loading and incidence range. The blade 200 may be used in a rotor, stator, or both.

FIG. 3A-3C illustrate the low pressure surface shape, boundary layer shape, and static pressure coefficient of an airfoil against an airfoil chord, respectively, in accordance with some embodiments of the present disclosure. FIG. 3A illustrates a bump surface profile of the low pressure surface of a blade in accordance to some embodiments. In FIG. 3A, 'x' is the cord-wise displacement of an airfoil having a chord 'c.' The height of a low-pressure surface, 'y,' normalized by the chord length 'c' is displayed on the vertical axis. The bump surface of FIG. 3A results from a finite discontinuous curvature distribution proximate to 0.75 x/c. The airfoil of FIG. 3A has a thickness no greater than 0.085 times the chord of the airfoil.

The discontinuity of FIG. 3A results in the boundary layer profile of FIG. 3B and the static pressure coefficient of FIG. 3C. As can be seen in FIG. 3B, the boundary layer maintains a relatively constant height 'H' along the low pressure surface from the leading edge of the foil to proximate to the discontinuity. Proximate to the discontinuity, there is a large pressure recovery, $\Delta C_p$, as shown in FIG. 3C. This aggressive pressure rise over a short length of the airfoil approximates a shock. The discontinuity further creates a loading profile closer to a parallelogram, exhibits a lower suction peak (reduced peak low pressure Mach number), and a larger loading envelope area (increased flow turning).

Figure 4:
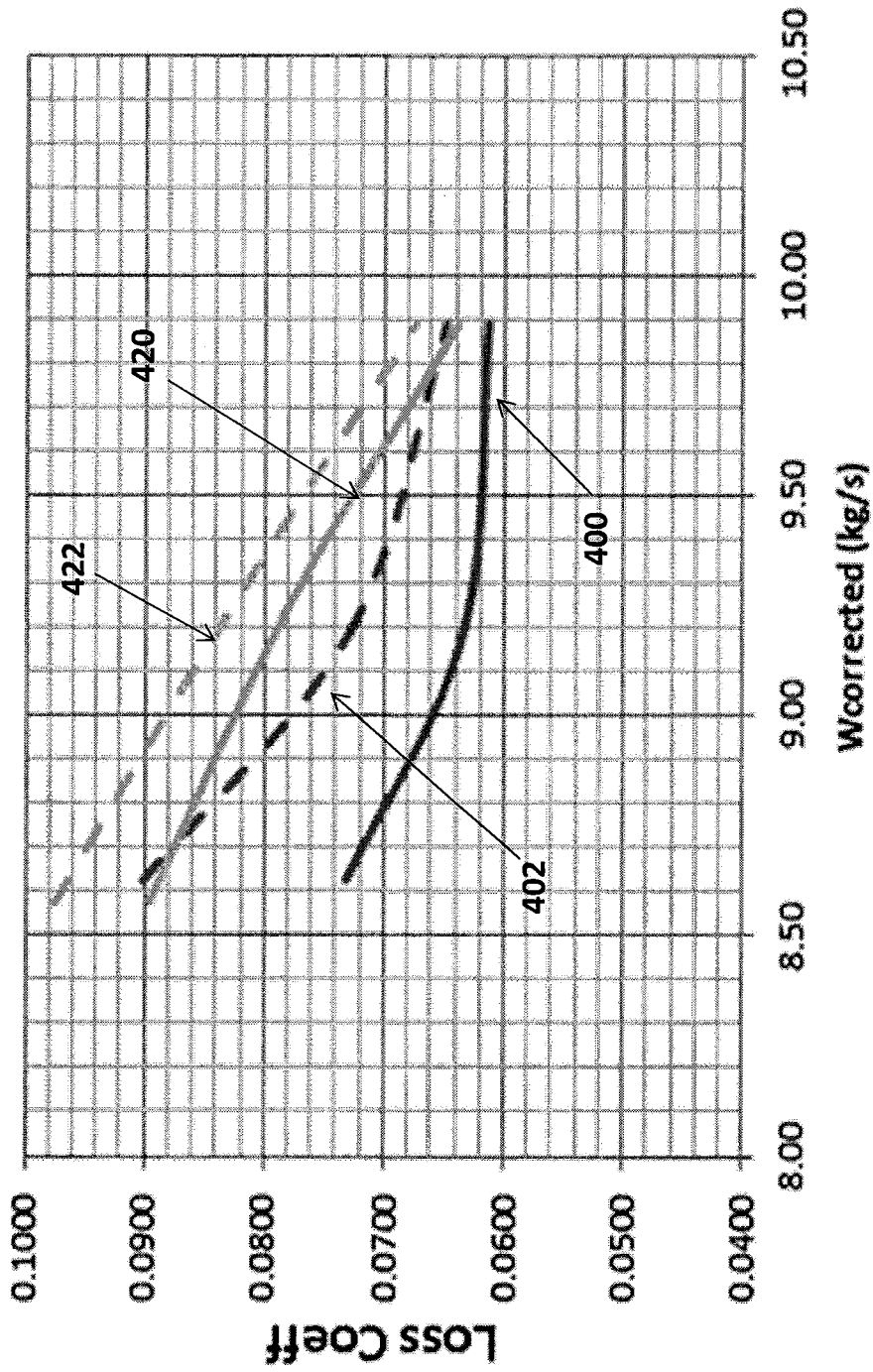
FIG. 4 illustrates the loss characteristics of a blade in accordance with some embodiments of the present disclosure.

FIG. 4 illustrates the loss characteristics of a blade in accordance with some embodiments of the present disclosure, and the loss characteristic of a conventional compressor. Lines 400 and 402 represent the mass- and area-average cascade loss, respectively, for a blade in accordance with some embodiments of the present disclosure. Lines 420 and 422 represent the mass- and area-average cased loss, respectively, for a conventional compressor. A low-speed test was conducted on a 1.5 stage axial-compressor rig across a wide range of inlet flows. As can be seen from FIG. 4, the blade in accordance with some embodiments of the present disclosure exhibited reduced loss coefficients when compared with the conventional compressor over the range of inlet flows. It is expected that the higher the relative inlet Mach number, the more loss reduction and incidence range can be realized, with a limit of approximately 0.9 to 0.95.

In accordance with some embodiments of the present disclosure, a method of pressure recovery for one or more blades is presented. The method may be applied to a gas turbine compressor having a turbomachine with a plurality of blades extending radially between a hub and a casing which operates on a gas stream. Each of the blades has a high pressure surface and a low pressure surface, both surfaces being locating between a leading edge and a trailing edge. Both the high and low pressure surfaces may be uninterrupted. The method may comprise accelerating the gas stream to a subsonic velocity over the low pressure surface. This subsonic velocity may be maintained on a front portion of the portion of the blade, which may be forward of a chord midpoint. In some embodiments, the front portion is forward of a discontinuity in the curvature of the blade. The method further comprises introducing a discontinuity in the curvature of the low pressure surface, and rapidly reducing the velocity of the gas stream proximate the discontinuity, thereby recovering pressure. The discontinuity may be proximate to ⅔ or ¾ chord of the blade. The turbomachine may be a rotor or stator.

While one or more embodiments of the present disclosure may describe a discontinuity aft of mid chord on a low pressure surface, the present embodiments are not so limited. A finite discontinuity may be located on the high pressure surface, low pressure surface, or both. Further, the discontinuity may be located at any intermediate position located between the leading and trailing edges of either the high or low pressure surface. For example, a discontinuity may be located at approximately ⅕, ¼, ⅓, ½, ⅔, ¾, or ⅘ of the distance between the leading edge and mid chord, mid chord and the trailing edge, the leading edge and trailing edge, respectively, or at some other location along the chord of the blade as required for a particular application.

While preferred embodiments of the present disclosure have been described, it is to be understood that the embodiments described are illustrative only and that the scope of the disclosure is to be defined solely by the appended claims when accorded a full range of equivalence, many variations and modifications naturally occurring to those of skill in the art from a perusal hereof.

I claim:

1. A blade comprising:
   a high pressure surface, and a low pressure surface connected at a leading edge and trailing edge of the blade;
   wherein the high pressure and low pressure surfaces extend span wise from a first end to a second end; the low pressure surface having a discontinuity in a chord-wise curvature of an intermediate portion of the low pressure surface between the blade leading edge and blade trailing edge;
   wherein the high pressure and low pressure surfaces form an uninterrupted surface extending from the first end to the second end and from the leading edge to the trailing edge wherein the blade thickness increases monotonically from the leading edge to a point of maximum blade thickness and the discontinuity in curvature occurs at, or immediately downstream of the point of maximum blade thickness, and
   wherein the discontinuity in curvature causes a reduction in Mach number and increasing the static pressure at an edge of a boundary layer formed on the low pressure surface, the increase in static pressure approximating a shock.

2. The blade according to claim 1, wherein the discontinuity in curvature is aft of the mid chord.

3. The blade according to claim 2, wherein the discontinuity in curvature is proximate to the ⅔ chord.

4. The blade according to claim 2, wherein the discontinuity in curvature is proximate to the ¾ chord.

5. The blade according to claim 1, wherein the first end comprises an end wall substantially perpendicular to the span of the blade.

6. The blade according to claim 5, wherein the second end comprises an end wall substantially perpendicular to the span of the blade.

7. The blade according to claim 1, further comprising a solid interior between the high pressure and low pressure surfaces along the entire span.

8. The blade according to claim 1, wherein the discontinuity in curvature is caused by a discontinuity in one or more of the first and second derivatives of the low pressure surface profile.

9. The blade according to claim 1, wherein the blade thickness decreases monotonically from the point of maximum blade thickness to the trailing edge.

10. The blade according to claim 1, wherein the blade is a compressor rotor blade.

11. The blade according to claim 1, wherein the blade is a compressor stator blade.

12. The blade according to claim 1, further comprising a second discontinuity in curvature in the chord-wise curvature of the high pressure surface.

13. The blade according to claim 1, wherein the low pressure surface turning towards the high pressure surface at the discontinuity in curvature when moving downstream from the discontinuity.

14. A turbine compressor blade comprising:
   a solid interior defined by a high pressure surface, a low pressure surface, a leading edge, a trailing edge, a first end, and a second end, wherein the high and low pressure surfaces are connected to each other at the leading and trailing edges and both the high and low pressure surfaces extend from the first end to the second end,
   wherein at least one of the high pressure surface and the low pressure surface has a discontinuity in curvature at an intermediate position along a chord of the blade;
   wherein the solid interior extends between the high pressure and low pressure surfaces along the entire span from the first end to the second end and from the leading edge to the trailing edge;
   wherein the blade thickness increases monotonically from the leading edge to a point of maximum blade thickness and the discontinuity in curvature occurs at, or immediately downstream of the point of maximum blade thickness and
   wherein the discontinuity in curvature causes a reduction in Mach number and increasing the static pressure at an edge of a boundary layer formed on the low pressure surface, the increase in static pressure approximating a shock.

15. The turbine compressor blade according to claim 14, wherein the low pressure surface turning towards the high pressure surface at the discontinuity in curvature when moving downstream from the discontinuity.

* * * * *